United States Patent [19]
Fukuda et al.

[11] Patent Number: 5,291,277
[45] Date of Patent: Mar. 1, 1994

[54] DIGITAL IMAGE SIGNAL PROCESSING CIRCUITS

[75] Inventors: Tokuya Fukuda; Toshitaka Senuma; Toru Shiono, all of Tokyo, Japan

[73] Assignee: Sony Corporation, Tokyo, Japan

[21] Appl. No.: 62,179

[22] Filed: May 17, 1993

[30] Foreign Application Priority Data

Jun. 12, 1992 [JP] Japan ................... 4-153903

[51] Int. Cl.⁵ .................................... H04N 9/64
[52] U.S. Cl. ................... 348/606; 348/624; 348/625; 348/665; 348/659
[58] Field of Search ............ 358/21 R, 27, 28, 29, 358/30, 31, 36, 37, 41, 162, 166, 167, 181, 909, 906; H04N 9/64

[56] References Cited

U.S. PATENT DOCUMENTS 5,134,487 7/1992 Taguchi et al. ............... 358/906
5,142,375 8/1992 Fukuda et al. ............... 358/906

Primary Examiner—Victor R. Kostak
Assistant Examiner—Sherrie Hsia
Attorney, Agent, or Firm—Lewis H. Eslinger; Jay H. Maioli

[57] ABSTRACT

A digital image signal processing circuit for use in a VTR with camera has a signal input terminal to which an image pickup output signal or a video signal is supplied, an analog to digital converter for producing a digital image pickup output signal based on the image pickup output signal or a digital video signal based on the video signal, a digital signal processing portion including first, second and third digital signal processing circuit blocks, a system controller for conducting the change of operation, the change of circuit configuration or the change of circuit coefficient in each of the first, second and third digital signal processing circuit blocks, and signal output terminals from which recording luminance and carrier chrominance signals produced by the digital signal processing portion are derived. Each of the first, second and third digital signal processing circuit blocks performs efficiently various kinds of digital processing to the digital image pickup output signal or the digital video signal.

5 Claims, 1 Drawing Sheet

DIGITAL IMAGE SIGNAL PROCESSING CIRCUITS

BACKGROUND OF THE INVENTION

Field of the Invention

The present invention generally relates to digital image signal processing circuits, and more particularly, is directed to improvements in a digital image signal processing circuit which is used in an image pickup and recording apparatus, in which a first operating condition for recording on a record medium a video signal obtained from an image pickup output signal obtained from an image pickup device on and a second operating condition for recording a video signal supplied from the outside a record medium are selectively set up, so as to perform various kinds of digital processing to the video signal obtained from the output signal of the image pickup device or the video signal supplied from the outside.

There has been proposed an image pickup and recording apparatus which corresponds to both of a video camera operative to perform image pickup operation to obtain an image pickup output signal and to produce a video signal based on the image pickup output signal and a video tape recorder operative to record a video signal on a magnetic tape, incorporated with each other, and comprises a camera portion functioning as the video camera and a recorder portion functioning as the video tape recorder. Such an image pickup and recording apparatus has been put to practical use as a so-called video tape recorder incorporated with a video camera (hereinafter, referred to as a VTR with camera).

In the VTR with camera which works with a color video signal, a first operating condition in which the camera portion thereof is operative to produce the color video signal containing a luminance signal and a carrier chrominance signal based on an image pickup output signal obtained through an image pickup operation and the recorder portion is operative to produce a recording luminance signal and a recording carrier chrominance signal by processing the luminance signal and the carrier chrominance signal constituting the color video signal produced by the camera portion to be suited for recording and further operative to record the recording luminance and recording carrier chrominance signals on a magnetic tape, and a second operating condition in which a color video signal containing a luminance signal and a carrier chrominance signal is supplied from the outside to an external input terminal provided to the recorder portion and the recorder portion is operative to produce the recording luminance signal and the recording carrier chrominance signal by processing the luminance signal and the carrier chrominance signal constituting the color video signal supplied from the outside to be suited for recording and further operative to record the recording luminance and carrier chrominance signals on the magnetic tape, are selectively set up.

The VTR with camera working with the color video signal in the manner mentioned above is required to have a signal processing circuit for producing the color video signal based on the image pickup output signal in the camera portion (hereinafter, referred to as a camera signal processing circuit) and another signal processing circuit for producing the recording luminance and recording carrier chrominance signals based on the luminance and carrier chrominance signals constituting the color video signal in the recorder portion (hereinafter, referred to as a recorder signal processing circuit). In the previously proposed VTR with camera working with the color video signal, the camera signal processing circuit and the recorder signal processing circuit are independently designed to be exclusively used in the camera portion and the recorder portion, respectively. For example, the camera signal processing circuit is formed in several integrated circuit chips mounted on a first printed wiring board to be used in the camera portion and the recorder signal processing circuit is formed another several integrated circuit chips mounted on a second printed wiring board to be used in the recorder portion.

Each of the camera signal processing circuit and the recorder signal processing circuit which are independently provided in the VTR with camera as mentioned above comprises a plurality of circuit sections each taking charge of respective signal processing. The camera signal processing circuit contains usually selected circuit sections in no small numbers, each of which is common or compatible in function with a corresponding selected one of circuit sections contained in the recorder signal processing circuit. These selected circuit sections contained in the camera signal processing circuit and the recorder signal processing circuit, respectively, to correspond to each other perform substantially the same signal processing operation or respective signal processing operations bearing a close resemblance to each other. Especially, in the case where each of the camera signal processing circuit and the recorder signal processing circuit is formed into a digital circuit in which major signal processings are digitalized, the camera signal processing circuit and the recorder signal processing circuit contain, in addition to the selected circuit sections as mentioned above, respective circuit sections corresponding to each other which perform different kinds of signal processing operations, respectively, but handle digital signals having substantially the same bit rate or respective bit rates very close to each other, so as to have respective filter characteristics very close to each other and therefore each of which can perform both of the different kinds of signal processing operations selectively.

Under such circumstances, the signal processing circuit system in the previously proposed VTR with camera in which the camera signal processing circuit and the recorder signal processing circuit are independently provided and therefore a complicated circuit structure using a large number of circuit elements is employed so that production cost is increased and power consumption is relatively large, is desired to be improved by simplifying the whole construction.

OBJECTS AND SUMMARY OF THE INVENTION

Accordingly, it is an object of the present invention to provide a digital image signal processing circuit for use in an image pickup and recording apparatus, in which a first operating condition for recording on a record medium a video signal formed based on an image pickup output signal obtained from an image pickup portion for picking up images and a second operating condition for recording on a record medium a video signal supplied from the outside are selectively set up, to perform various kinds of digital processing to the image pickup output signal obtained from the image pickup device or the video signal supplied from the outside, which avoids the aforementioned disadvantages and problems encountered with the prior art.

Another object of the present invention is to provide a digital image signal processing circuit for use in an image pickup and recording apparatus, in which a first operating condition for recording on a record medium a video signal formed based on an image pickup output signal obtained from an image pickup portion for picking up images and a second operating condition for recording on a record medium a video signal supplied from the outside are selectively set up, to perform various kinds of digital processing to the image pickup output signal obtained from the image pickup device or the video signal supplied from the outside, which is reduced in number of circuit elements employed therein to be simplified in construction.

A further object of the present invention is to provide a digital image signal processing circuit for use in an image pickup and recording apparatus, in which a first operating condition for recording on a record medium a video signal formed based on an image pickup output signal obtained from an image pickup portion for picking up images and a second operating condition for recording on a record medium a video signal supplied from the outside are selectively set up, to perform various kinds of digital processing to the image pickup output signal obtained from the image pickup device or the video signal supplied from the outside, which is able to carry out, with improved efficiency, various kinds of digital processing to the image pickup output signal obtained from the image pickup device and the video signal supplied from the outside with a configuration by which the production cost is reduced and power consumption is also reduced.

According to the present invention, there is provided a digital image signal processing circuit for use in an image pickup and recording apparatus containing an image pickup portion and a video signal recording portion, which comprises a signal input terminal portion to which an image pickup output signal obtained from the image pickup portion and a video signal supplied from the outside are selectively supplied, an analog to digital converting portion for digitalizing the image pickup output signal or the video signal supplied to the signal input terminal portion to produce a digital image pickup output signal or a digital video signal, a digital signal processing portion including first, second and third digital signal processing circuit blocks to which the digital image pickup output signal or the digital video signal is supplied, a system controller provided in common to the first, second and third digital signal processing circuit blocks for conducting the change of operation, the change of circuit configuration or the change of circuit coefficient in each of the first, second and third digital signal processing circuit blocks in response to the selective supply of the image pickup output signal or the video signal to the signal input terminal portion, and a signal output terminal portion from which a recording luminance signal and a recording chrominance signal which are produced by the digital signal processing portion are derived, wherein the first digital signal processing circuit block is operative to produce separately first digital luminance and chrominance signals based on the digital image pickup output signal and to cause the first digital luminance signal to be subjected to vertical aperture correction when the image pickup output signal is supplied to the signal input terminal portion, and to produce second digital luminance and chrominance signals based on the digital video signal and to work on the second digital chrominance signal as a comb filter when the video signal is supplied to the signal input terminal portion; the second digital signal processing circuit block is operative to function as a matrix circuit for the first digital chrominance signal when the image pickup output signal is supplied to the signal input terminal portion and to function as a decoding circuit for the second digital chrominance signal when the video signal is supplied to the signal input terminal portion; and the third digital signal processing circuit block is operative to function as an encoding circuit for the first digital chrominance signal when the image pickup output signal is supplied to the signal input terminal portion and to produce a digital frequency-converted carrier chrominance signal having its carrier frequency converted to be lowered based on the second digital chrominance signal when the video signal is supplied to the signal input terminal portion.

In the digital image signal processing circuit thus constituted in accordance with the present invention, under a condition in which each of the first, second and third digital signal processing circuit blocks contained in the digital signal processing portion is provided in common to the digital image pickup output signal produced based on the image pickup output signal supplied to the signal input terminal portion from the image pickup portion or the digital video signal produced based on the video signal supplied to the signal input terminal from the outside by the analog to digital converting portion, and the system controller is provided in common to the first, second and third digital signal processing circuit blocks, each of the first, second and third digital signal processing circuit blocks is controlled by the system controller to conduct the change of operation mode, the change of circuit configuration or the change of circuit coefficient in response to the selective supply of the image pickup output signal or the video signal to the signal input terminal portion. Therefore, each of the first, second and third digital signal processing circuit blocks operates to cause the digital image pickup output signal to be subjected to digital processing to produce the recording luminance signal and the recording chrominance signal therefrom when the image pickup output signal is supplied to the signal input terminal portion from the image pickup portion and further operates to cause the digital video signal to be subjected to digital processing to produce the recording luminance signal and the recording chrominance signal thereform when the video signal is supplied to the signal input terminal from the outside.

As described above, a circuit configuration in which a signal processing circuit for producing a video signal based on the image pickup output signal from the image pickup portion and another signal processing circuit for producing the recording luminance signal and the recording chrominance signal based on the video signal produced from the image pickup output signal or the video signal supplied to the signal input terminal portion from the outside are separately provided is not adopted. However, a digital signal processing circuit for causing the digital image pickup output signal, which is formed based on the image pickup output signal from the image pickup portion, to be subjected to various kinds of digital processing to produce the recording luminance signal and the recording chrominance signal and another digital signal processing circuit for causing the digital video signal, which is formed based on the video signal supplied to the signal input terminal portion from the outside, to be subjected to various kinds of digital processing to produce the recording luminance signal and the recording chrominance signal, are selectively constituted in the digital signal processing portion containing the first, second and third digital signal processing circuit blocks. Accordingly, with the digital image signal processing circuit according to the present invention, various kinds of digital processing to each of the digital image pickup output signal formed from the image pickup output signal from the image pickup portion and the digital video signal formed from the video signal supplied to the signal input terminal portion are efficiently carried out with an advantageous circuit configuration which is reduced in number of circuit elements employed therein to be considerably simplified and therefore by which the production cost is reduced and power consumption is also reduced.

The above, and other objects, features and advantages of the digital image signal processing circuit according to the present invention will become apparent from the following detailed description taken in conjunction with the accompanying drawing.

DESCRIPTION OF THE PREFERRED EMBODIMENT

Figure 1:
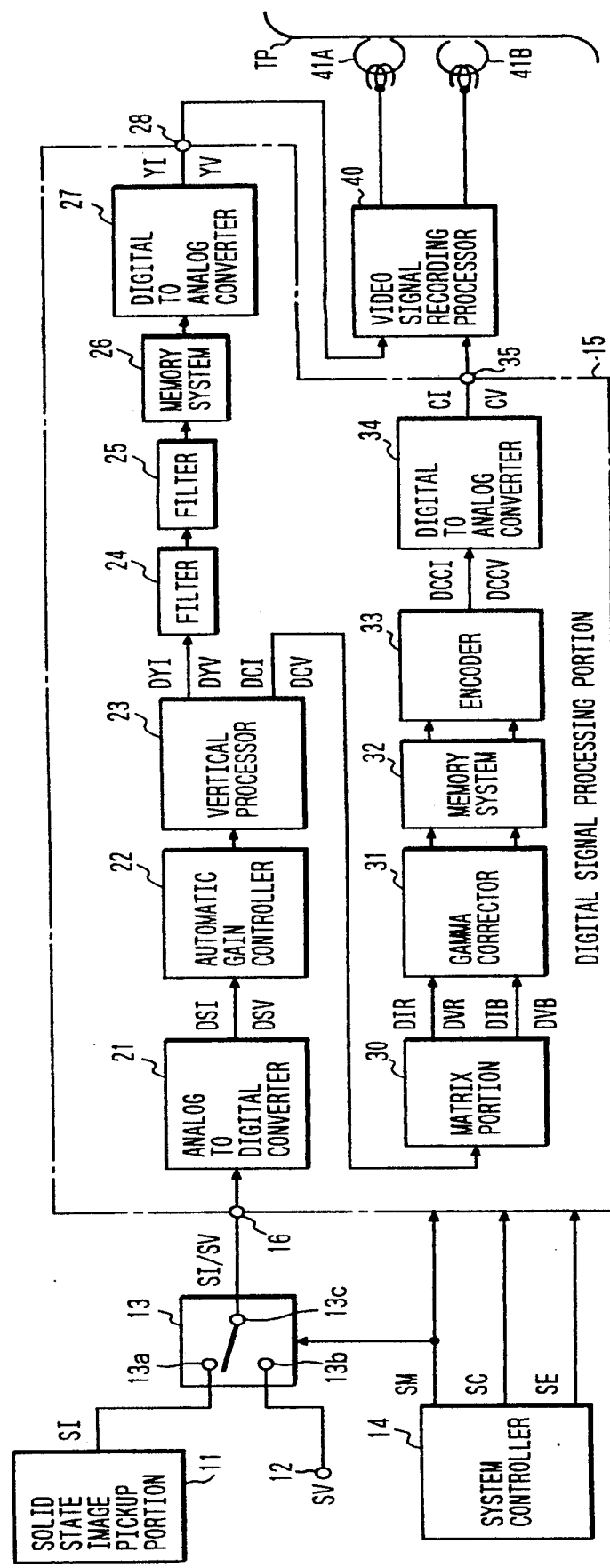
FIG. 1 is a schematic circuit block diagram showing an embodiment of digital image signal processing circuit according to the present invention, together with a schematic configuration of a VTR with camera in which the embodiment is applied.

FIG. 1 shows schematically an example of VTR with camera to which an embodiment of digital image signal processing circuit is applied.

Referring to FIG. 1, a solid state image pickup portion 11 in which a plurality of charge coupled devices (CCDs) are used and an external signal input terminal 12 for an external video signal are provided. The solid state image pickup portion 11 is provided with an optical color filter (not shown in FIG. 1) and operative to pick up images to produce an image pickup output signal SI. A color video signal SV comprising a luminance signal and a carrier chrominance signal is supplied to the external signal input terminal 12 from the outside. The image pickup output signal SI from the solid state image pickup portion 11 and the color video signal SV supplied to the external signal input terminal 12 are selectively obtained. An output terminal of the solid state image pickup portion 11 and the external signal input terminal 12 are connected to a pair of contacts 13a and 13b of a switch 13, respectively. The switch 13 is controlled by an operation mode control signal SM derived from a system controller 14 which is constituted, for example, with a microcomputer so as to extract the image pickup output signal SI through the contact 13a and a movable contact 13c when the image pickup output signal SI is supplied to the contact 13a from the solid state image pickup portion 11 and to extract the color video signal SV through the contact 13b and the movable contact 13c when the color video signal SV is supplied from the external signal input terminal 12.

The image pickup output signal SI or the color video signal SV extracted by the switch 13 is supplied to a signal input terminal 16 of a digital signal processing portion 15. The digital signal processing portion 15 is also provided with the operation mode control signal SM, a circuit configuration control signal SC and a circuit coefficient control signal SE each derived from the system controller 14. The embodiment of digital image signal processing circuit according to the present invention is constituted by a circuit construction including the system controller 14 and the digital signal processing portion 15.

In the digital signal processing portion 15, an analog to digital (A/D) converter 21, an automatic gain controller (AGC) 22 and a vertical processor 23 are connected in series to the signal input terminal 16. The vertical processor 23 comprises a plurality of digital 1H delay devices, a plurality of adders and a plurality of subtracters. The digital 1H delay device is operative to delay a signal supplied thereto by a period corresponding to one horizontal period (1H) of a video signal and constituted by, for example, a memory device which operates with a clock pulse signal having a predetermined frequency to write and then read each portion of the signal supplied thereto corresponding to 1H of the video signal.

Filters 24 and 25, a memory system 26 and a digital to analog (D/A) converter 27 are connected in series to one of a pair of output terminals of the vertical processor 23 and an output terminal of the digital to analog converter 27 is connected with a first signal output terminal 28.

Further, a matrix portion 30, a gamma corrector 31, a memory system 32, an encoder 33 and a digital to analog (D/A) converter 34 are connected in series to the other of the pair of output terminals of the vertical processor 23 and an output terminal of the digital to analog converter 34 is connected with a second signal output terminal 35.

Each of circuit sections including respectively the series connection of the analog to digital converter 21 to the digital to analog converter 27 and the series connection of the matrix portion 30 to the digital to analog converter 34, which constitutes the digital signal processing portion as mentioned above, is appropriately supplied with the operation mode control signal SM, the circuit configuration control signal SC and the circuit coefficient control signal SE and conducts the change of operation in response to the selective supply of the image pickup output signal SI or the color video signal SV to the signal input terminal 16 under the control of the operation mode control signal SM, the change of circuit configuration in response to the selective supply of the image pickup output signal SI or the color video signal SV to the signal input terminal 16 under the control of the circuit configuration control signal SC, or the change of circuit coefficient in response to the selective supply of the image pickup output signal SI or the color video signal SV to the signal input terminal 16 under the control of the circuit coefficient control signal SE. In such a condition as mentioned above, a first operation mode is set up when the image pickup output signal SI from the solid state image pickup portion 11 is supplied to the signal input terminal 16 and a second operation mode is set up when the color video signal SV from the outside is supplied to the signal input terminal 16 in the digital signal processing portion 15.

The analog to digital converter 21 is operative to digitalize the image pickup output signal SI from the solid state image pickup portion 11 for producing a digital image pickup output signal DSI having a predetermined sampling frequency in the condition of the first operation mode wherein the image pickup output signal SI is supplied to the signal input terminal 16 and to digitalize the color video signal SV from the outside for producing a digital video signal DSV having a predetermined sampling frequency in the condition of the second operation mode wherein the color video signal SV is supplied to the signal input terminal 16. The automatic gain controller 22 is operative to cause the digital image pickup output signal DSI obtained from the analog to digital converter 21 to be subjected to an automatic gain control in the condition of the first operation mode and to cause the digital video signal DSV obtained from the analog to digital converter 21 to be subjected to the automatic gain control in the condition of the second operation mode.

The vertical processor 23 constitutes one of digital signal processing circuit blocks, which is operative to produce separately a digital luminance signal DYI and a digital chrominance signal DCI based on the digital image pickup output signal DSI obtained through the automatic gain controller 22 to be derived from a pair of output terminals thereof, respectively, and further to cause the digital luminance signal DYI to be subjected to vertical aperture correction in the condition of the first operation mode, and to produce separately a digital luminance signal DYV and a digital chrominance signal DCV based on the digital video signal DSV obtained through the automatic gain controller 22 to be derived from the output terminals thereof, respectively, and further to work on the digital chrominance signal DCV as a comb filter in the condition of the second operation mode.

The filter 24 constitutes one of the digital signal processing circuit blocks, which is operative to cause the digital luminance signal DYI derived from one of the output terminals of the vertical processor 23 to be subjected to horizontal aperture correction in the condition of the first operation mode and to cause the digital luminance signal DYV derived from one of the output terminals of the vertical processor 23 to be subjected to processing for improving sharpness in the condition of the second operation mode. The filter 25 is operative to cause the digital luminance signal DYI obtained from the filter 24 to be subjected to processing for slicing noise in the condition of the first operation mode and to cause the digital luminance signal DYV obtained from the filter 24 to be subjected to noise reduction in the condition of the second operation mode.

The memory system 26 constitutes one of the digital signal processing circuit blocks, which is provided with a memory device in which each vertical period segment, such as a field period segment, of the digital luminance signal DYI or DYV obtained from the filter 25 is tentatively stored, and operative to cause the digital luminance signal DYI to be subjected to time base correction for suppressing handling vibrations in the condition of the first operation mode and to cause the digital luminance signal DYV to be subjected to time base correction for suppressing jitters in the condition of the second operation mode.

The digital to analog converter 27 is operative to convert to analog form the digital luminance signal DYI obtained from the memory system 26 to produce a recording luminance signal YI to be derived from a first signal output terminal 28 in the condition of the first operation mode and to convert to analog form the digital luminance signal DYV obtained from the memory system 26 to produce a recording luminance signal YV to be derived from the first signal output terminal 28.

The matrix portion 30 constitutes one of the digital signal processing circuit blocks, which is operative to function as a matrix circuit for the digital chrominance signal DCI obtained from the other of the output terminals of the vertical processor 23 to produce separately color signal components DIR and DIB, each of which is a kind of digital chrominance signal, based on the digital chrominance signal DCI in the condition of the first operation mode and to function as a matrix circuit for the digital chrominance signal DCV obtained from the other of the output terminals of the vertical processor 23 to produce separately color signal components DVR and DVB, each of which is a kind of digital chrominance signal, based on the digital chrominance signal DCV in the condition of the second operation mode.

The gamma corrector 31 is operative to cause each of the color signal components DIR and DIB obtained from the matrix portion 30 to pass through a processing circuit having an exponential input-output level characteristic in the condition of the first operation mode and to cause each of the color signal components DVR and DVB obtained from the matrix portion 30 to pass therethrough without being subjected to any processing in the the condition of the second operation mode.

The memory system 32 constitutes one of the digital signal processing circuit blocks, which is provided with a memory device in which each vertical period segment, such as a field period segment, of each of the color signal components DIR and DIB or DVR and DVB obtained from the gamma corrector 31 is tentatively stored, and operative to cause each of the color signal components DIR and DIB obtained from the gamma corrector 31 to be subjected to time base correction for suppressing handling vibrations in the condition of the first operation mode and to cause each of the color signal components DVR and DVB obtained from the gamma corrector 31 to be subjected to time base correction for suppressing jitters in the condition of the second operation mode.

The encoder 33 constitutes one of the digital signal processing circuit blocks, which is operative to function as an encoding circuit for the color signal components DIR and DIB obtained from the memory system 32 to produce a digital carrier chrominance signal DCCI based on the color signal components DIR and DIB in the condition of the first operation mode and to function as an encoding circuit for the color signal components DVR and DVB obtained from the memory system 32 to produce, based on the color signal components DVR and DVB obtained from the memory system 32, a digital frequency-converted carrier chrominance signal DCCV having its carrier frequency converted to be lower than the carrier frequency of the digital carrier chrominance signal DCV in the condition of the second operation mode.

The digital to analog converter 34 is operative to convert to analog form the digital carrier chrominance signal DCCI obtained from the encoder 33 to produce a recording carrier chrominance signal CI to be derived from a second signal output terminal 35 in the condition of the first operation mode and to convert to analog form the digital frequency-converted carrier chrominance signal DCCV obtained from the encoder 33 to produce a recording carrier chrominance signal CV to be derived from the second signal output terminal 35 digital chrominance signal DCV in the condition of the second operation mode.

The recording luminance signal YI and the recording carrier chrominance signal CI derived from the first and second signal output terminals 28 and 35, respectively, in the condition of the first operation mode or the recording luminance signal YV and the recording carrier chrominance signal CV derived from the first and second signal output terminals 28 and 35, respectively, in the condition of the second operation mode, are supplied to a video signal recording processor 40. In the video signal recording processor 40, the recording luminance signal YI and the recording carrier chrominance signal CI or the recording luminance signal YV and the recording carrier chrominance signal CV are subjected to processing necessary for being recorded on a magnetic tape and combined with each other to produce a recording video signal. Then, vertical period segments, for example, field period segments of the recording video signal are successively recorded on a magnetic tape TP by a pair of rotary magnetic heads 41A and 41B which scan the magnetic tape TP alternately.

In the manner mentioned above, various kinds of digital processing to each of the digital image pickup output signal DSI formed from the image pickup output signal SI obtained from the solid state image pickup portion 11 and the digital video signal DSV formed from the color video signal SV supplied to the external signal input terminal 12 are efficiently carried out with the relatively simplified circuit configuration by which the production cost is reduced and power consumption is also reduced in the digital signal processing portion 15.

What is claimed is:

1. A digital image signal processing circuit for use in an image pickup and recording apparatus containing an image pickup portion and a video signal recording portion, the circuit comprising:

signal input terminal means to which an image pickup output signal obtained from the image pickup portion and a video signal supplied from the outside are selectively supplied, analog to digital converting means for digitizing one of the image pickup output signal and the video signal supplied to the signal input terminal means to produce one of a digital image pickup output signal and a digital video signal, digital signal processing means including first, second and third digital signal processing circuit blocks to which one of the digital image pickup output signal and the digital video signal is supplied, system controller means provided in common to said first, second and third digital signal processing circuit blocks for conducting selectively the change of operation, the change of circuit configuration and the change of circuit coefficient in each of said first, second and third digital signal processing circuit blocks in response to the selective supply of one of the image pickup output signal and the video signal to the signal output terminal means, and signal output terminal means from which a recording luminance signal and a recording chrominance signal which are produced by the digital signal processing means are derived, wherein:

the first digital signal processing circuit block is operative to produce separately first digital luminance and chrominance signals based on the digital image pickup output signal and to cause the first digital luminance signal to be subjected to vertical aperture correction when the image pickup output signal is supplied to the signal input terminal means, and to produce second digital luminance and chrominance signals based on the digital video signal and to work on the second digital chrominance signal as a comb filter when the video signal is supplied to the signal input terminal means;

the second digital signal processing circuit block is operative to function as a matrix circuit for the first digital chrominance signal when the image pickup output signal is supplied to the signal input terminal means and to function as a decoding circuit for the second digital chrominance signal when the video signal is supplied to the signal input terminal means; and the third digital signal processing circuit block is operative to function as an encoding circuit for the first digital chrominance signal when the image pickup output signal is supplied to the signal input terminal means and to produce a digital frequency-converted carrier chrominance signal having its carrier frequency converted to a lower frequency on the basis of the second digital chrominance signal when the video signal is supplied to the signal input terminal means.

2. A digital image signal processing circuit according to claim 1 wherein said digital signal processing means further includes a fourth digital signal processing circuit block operative to cause the first digital luminance signal to be subjected to horizontal aperture correction when the image pickup output signal is supplied to the signal input terminal means and to cause the second digital luminance signal to be subjected to processing for improving sharpness when the video signal is supplied to the signal input terminal means.

3. A digital image signal processing circuit according to claim 1 wherein the image pickup output signal is obtained from the image pickup portion which is formed into a solid state image pickup portion, and the video signal supplied to the signal input terminal means includes a color video signal containing a luminance signal component and a carrier chrominance signal component.

4. A digital image signal processing circuit according to claim 2, wherein said digital signal processing means further includes a fifth digital signal processing circuit block operative to cause the first digital luminance signal to be subjected to time base correction for suppressing handling vibrations when the image pickup output signal is supplied to the signal input terminal means and to cause the second digital luminance signal to be subjected to time base correction for suppressing jitter when the video signal is supplied to the signal input terminal means.

5. A digital image signal processing circuit according to claim 4 wherein said digital signal processing means further includes a sixth digital signal processing circuit block operative to cause the first digital chrominance signal to be subjected to time base correction for suppressing handling vibrations when the image pickup output signal is supplied to the signal input terminal means and to cause the second digital chrominance signal to be subjected to time base correction for suppressing jitter when the video signal is supplied to the signal input terminal means.

* * * * *

UNITED STATES PATENT AND TRADEMARK OFFICE
CERTIFICATE OF CORRECTION

PATENT NO. : 5,291,277
DATED : March 1, 1994
INVENTOR(S) : Tokuya Fukuda, Toshitaka Senuma, and Toru Shiono It is certified that error appears in the above-indentified patent and that said Letters Patent is hereby corrected as shown below:

Col. 8, line 13, change "matrix" to --decoding--

Col. 9, line 61, change "output" to --input--
Col. 10, line 47, after "2" delete ","

Signed and Sealed this

Twenty-fourth Day of October, 1995

Attest:

BRUCE LEHMAN

Attesting Officer     Commissioner of Patents and Trademarks